(12) United States Patent
Long

(10) Patent No.: US 10,567,258 B2
(45) Date of Patent: Feb. 18, 2020

(54) SYSTEMS, METHODS, APPARATUS, AND COMPUTER-READABLE MEDIA FOR MONITORING A DATA STREAM

(71) Applicant: MasterCard International Incorporated, Purchase, NY (US)

(72) Inventor: Kenneth L. Long, O'Fallon, MO (US)

(73) Assignee: Mastercard International Incorporated, Purchase, NY (US)

( * ) Notice: Subject to any disclaimer, the term of this patent is extended or adjusted under 35 U.S.C. 154(b) by 960 days.

(21) Appl. No.: 15/066,764

(22) Filed: Mar. 10, 2016

(65) Prior Publication Data

US 2017/0264522 A1  Sep. 14, 2017

(51) Int. Cl.
*G06F 15/16* (2006.01)
*H04L 12/26* (2006.01)
*G06F 16/955* (2019.01)

(52) U.S. Cl.
CPC ............ *H04L 43/12* (2013.01); *G06F 16/955* (2019.01)

(58) Field of Classification Search
CPC ............................... G06F 16/955; H04L 43/12
USPC ........................................................ 714/47.1
See application file for complete search history.

(56) References Cited

U.S. PATENT DOCUMENTS

| | | | | |
|---|---|---|---|---|
| 7,124,110 B1* | 10/2006 | Kemp, II | ............... | G06Q 40/04 705/37 |
| 7,167,924 B1* | 1/2007 | Symonds | ............... | G06Q 20/10 705/43 |
| 2002/0138551 A1* | 9/2002 | Erickson | ................. | H04L 29/06 709/203 |
| 2007/0198741 A1* | 8/2007 | Duffy | .................. | G06F 17/3089 709/245 |
| 2007/0288526 A1* | 12/2007 | Mankad | .............. | G06F 11/1662 |
| 2015/0039672 A1* | 2/2015 | Hussain | .............. | H04L 67/2819 709/202 |
| 2015/0347965 A1* | 12/2015 | Wardman | ............... | G06Q 10/10 705/7.28 |
| 2016/0012465 A1* | 1/2016 | Sharp | .................... | G06Q 20/18 705/14.17 |
| 2016/0034900 A1* | 2/2016 | Nelsen | ............... | G06Q 20/4016 705/44 |
| 2016/0071094 A1* | 3/2016 | Krishnaiah | .......... | G06Q 20/363 705/66 |
| 2016/0092267 A1* | 3/2016 | Boyacigiller | ...... | G06Q 10/0633 718/103 |
| 2018/0189788 A1* | 7/2018 | Lacoss-Arnold | .......................... G06Q 20/4014 |

* cited by examiner

*Primary Examiner* — Kamini B Patel
(74) *Attorney, Agent, or Firm* — Hovey Williams LLP

(57) ABSTRACT

Systems, methods, and apparatus for monitoring flow of data traffic are described. For each of a plurality of transfer units from a data stream (e.g., messages from a message queue), a value of a first field of the transfer unit is mapped to a corresponding counter in random-access memory and the counter is updated. Counter values are periodically copied to a user-accessible region. In one example, message field values are obtained from database log files. In another example, message field values are obtained via an interface called by a database management system.

20 Claims, 15 Drawing Sheets

FIG. 1A
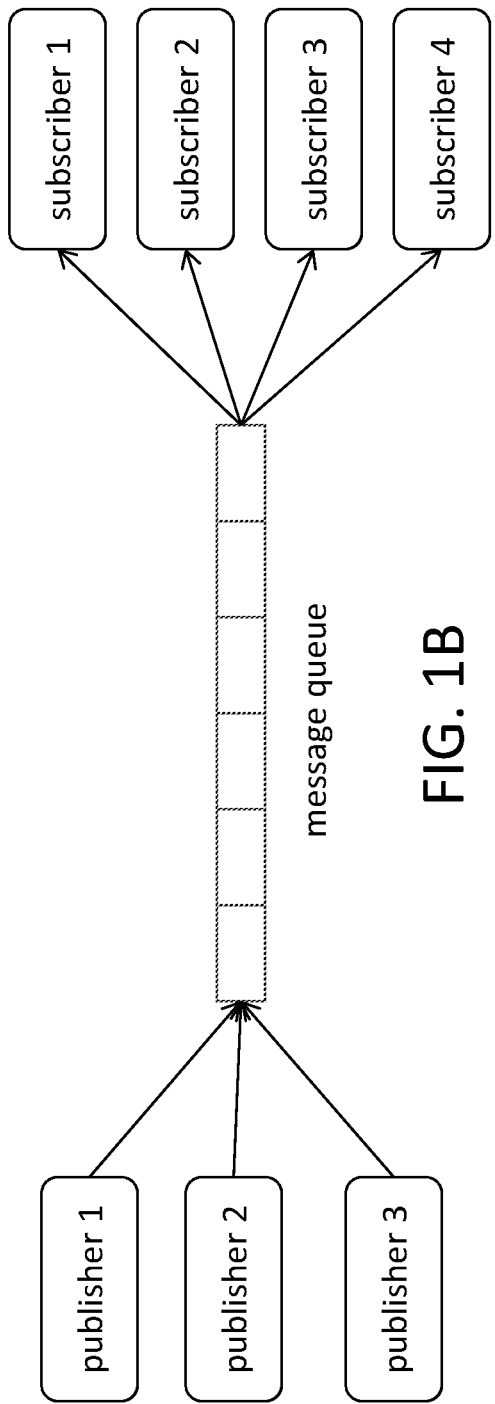
FIG. 1B
```
Select MTI, trunc(txn_date,'MI'), count(*)
from financial_transaction
where txn_date > sysdate - 5/1440
group by MTI, trunc(txn_date,'MI') ;
```
FIG. 1C

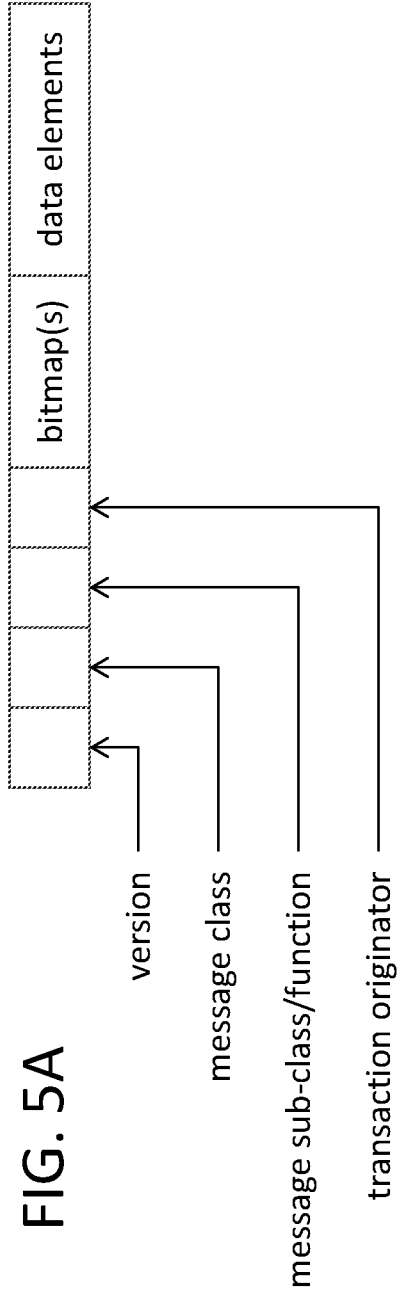
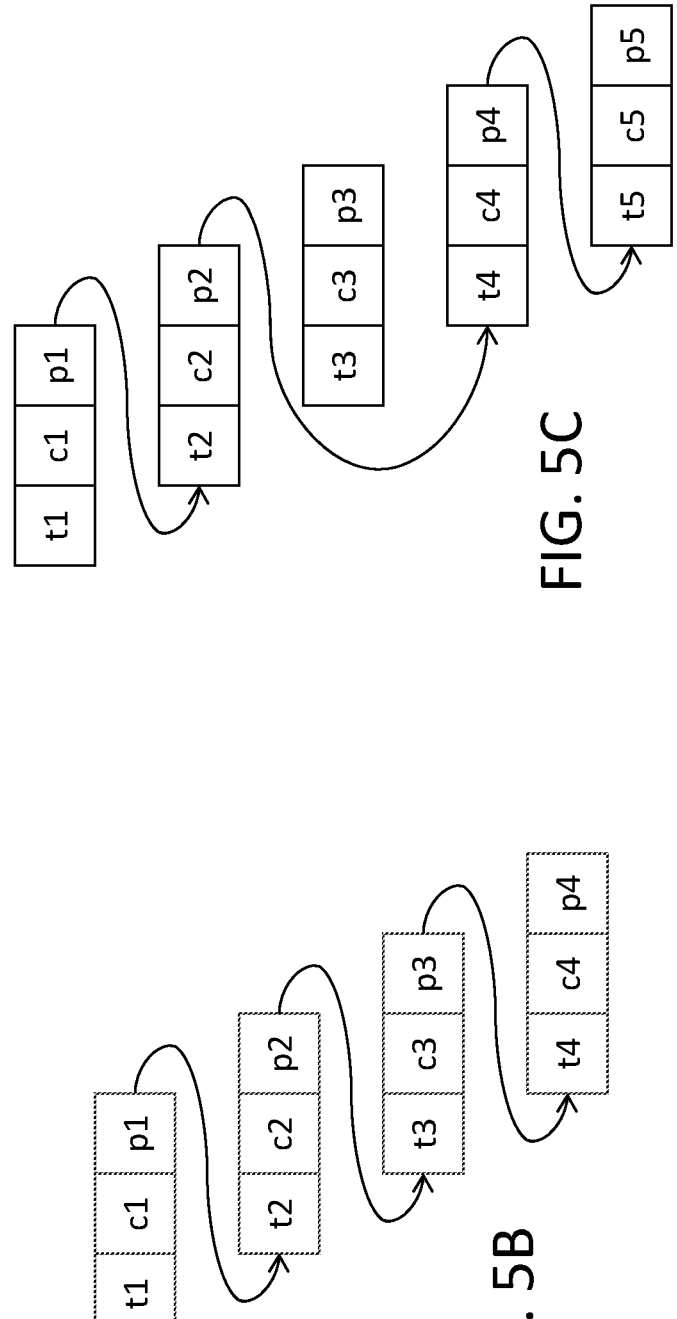
FIG. 5A
FIG. 5B
FIG. 5C

| INCOMING DATA | ACTION IN RESPONSE |
|---|---|
| MTI 0100 | Bucket(mti, 0100) +1 = 1 |
| MTI 0100 | Bucket(mti, 0100) +1 = 2 |
| MTI 0200 | Bucket(mti, 0200) +1 = 1 |
| MTI 0210 | NO ACTION |

FIG. 7B

| INCOMING DATA | ACTION IN RESPONSE |
|---|---|
| MTI 0100 | Bucket(mti, 0100) +1 = 1 |
| MTI 0100 | Bucket(mti, 0100) +1 = 2 |
| MTI 0200 | Bucket(mti, 0200) +1 = 1 |
| MTI 0210 | Bucket(mti, 0200) +1 = 2 |

FIG. 7A

| Time (HH:MM:SS) | Incoming data observed | Bucket(mti, 0100) | Bucket(mti, 0200) |
|---|---|---|---|
| 01:10:00 | --- | 0 | 0 |
| 01:10:01 | 5 MTI of 0100 and 3 MTI of 0200 | 5 | 3 |
| 01:10:02 | 2 MTI of 0100 and 1 MTI of 0200 | 7 | 4 |
| 01:10:03 | 5 MTI of 0100 and 5 MTI of 0200 | 12 | 9 |
| 01:10:04 | 3 MTI of 0100 and 1 MTI of 0200 | 15 | 10 |
| (Refresh) | (copy current counters and reset) | (store 15) | (store 10) |
| 01:10:05 | 5 MTI of 0100 and 5 MTI of 0200 | 5 | 5 |
| 01:10:06 | 5 MTI of 0100 and 5 MTI of 0200 | 10 | 10 |
| 01:10:07 | 10 MTI of 0100 and 5 MTI of 0200 | 20 | 15 |
| 01:10:08 | 10 MTI of 0100 and 5 MTI of 0200 | 30 | 20 |
| 01:10:09 | 10 MTI of 0100 and 5 MTI of 0200 | 40 | 25 |
| (Refresh) | (copy current counters and reset) | (store 40) | (store 25) |
| 01:10:10 | 3 MTI of 0100 and 0 MTI of 0200 | 3 | 0 |

FIG. 8A

| Time (HH:MM:SS) | Copy[Bucket(mti, 0100)] | Copy[Bucket(mti, 0200)] |
|---|---|---|
| 01:10:05 | 15 | 10 |
| 01:10:10 | 40 | 25 |

FIG. 8B

SYSTEMS, METHODS, APPARATUS, AND COMPUTER-READABLE MEDIA FOR MONITORING A DATA STREAM

BACKGROUND

Field of the Disclosure

Aspects of the disclosure relate in general to network monitoring and diagnostics.

Description of the Related Art

Message-oriented middleware is commonly used in modern distributed systems to support asynchronous communications among heterogeneous platforms. Such middleware uses message queues to carry communications among entities in the system. A message queue is a one-way channel that carries messages from one or more producers to one or more consumers. FIG. 1A shows a message queue according to a point-to-point model, in which a producer sends message to a consumer. FIG. 1B shows a message queue according to a publish-and-subscribe model, in which each among a set of publishers (producers) sends messages to one or more among a set of subscribers (consumers).

SUMMARY

A method, according to a general configuration, of monitoring a data stream is described. The method includes providing a data structure in random-access memory, including a plurality of counters, and a user-accessible data structure that is separate from the data structure. The method includes, for each of a plurality of transfer units from the data stream, receiving a first field of the transfer unit. For each of the received first fields, the method includes determining whether performing a predetermined mapping function on a value of the field maps the value to any counter among the plurality of counters and, in response to determining that said performing the predetermined mapping function on the value of the field maps the value to a counter among the plurality of counters, updating the mapped counter. The method also includes, upon expiration of a fixed interval, and for each of the plurality of counters, copying a current value of the counter to the user-accessible data structure and resetting the counter. Computer-readable storage media (e.g., non-transitory media) having instructions that cause one or more processors executing the instructions to perform such a method are also disclosed.

An apparatus, according to a general configuration, for monitoring a data stream is described. The apparatus includes a log reader configured to obtain, for each of a plurality of transfer units from the data stream, a first field of the transfer unit from a log file, and a random-access memory configured to store a data structure that includes a plurality of counters. The apparatus also includes a mapping module configured to determine, for each of the received first fields, whether performing a predetermined mapping function on a value of the field maps the value to any counter among the plurality of counters and, in response to determining that said performing the predetermined mapping function on the value of the field maps the value to a counter among the plurality of counters, to update the mapped counter. The apparatus also includes an interval timer configured to indicate expiration of a fixed interval, a user-accessible data structure that is separate from the data structure, and a refresh module configured to, upon said expiration indication and for each of the plurality of counters, copy a current value of the counter to the user-accessible data structure and reset the counter.

An apparatus, according to another general configuration, for monitoring a data stream is described. The apparatus includes an interface configured to obtain, for each of a plurality of transfer units from the data stream and in response to at least one function call by a calling application, a first field of the transfer unit, and a random-access memory configured to store a data structure that includes a plurality of counters. The apparatus also includes a mapping module configured to determine, for each of the received first fields, whether performing a predetermined mapping function on a value of the field maps the value to any counter among the plurality of counters and, in response to determining that said performing the predetermined mapping function on the value of the field maps the value to a counter among the plurality of counters, to update the mapped counter. The apparatus also includes an interval timer configured to indicate expiration of a fixed interval, a user-accessible data structure that is separate from the data structure, and a refresh module configured to, upon said expiration indication and for each of the plurality of counters, copy a current value of the counter to the user-accessible data structure and reset the counter.

BRIEF DESCRIPTION OF THE DRAWINGS

FIG. 1A shows a block diagram of a message queue according to a point-to-point model.

FIG. 1B shows a block diagram of a message queue according to a publish-and-subscribe model.

FIG. 1C shows an example of a query in SQL (Structured Query Language).

FIG. 5A shows a structure of an ISO 8583 message.

FIGS. 5B and 5C show examples of linked list implementations of in-memory data structure DS10.

FIGS. 7A and 7B show different examples of task T300.

FIGS. 8A and 8B show an example use of method M100.

DETAILED DESCRIPTION

The use of message-oriented middleware in systems, especially in the financial sector, requiring essentially real-time transactions is known. The performance of this middleware is an important part of the overall speed, reliability, and efficiency of conducting financial transactions, such as those made at point-of-sale (POS) locations with credit and debit cards. A common example of a message-oriented middleware offering is WebSphere® MQ, available from IBM®, though the example embodiments described herein may be implemented with other middleware offerings.

It may be desirable to perform efficient processing for grouping and operational statistics on a network that includes one or more message queues. For example, it may be desirable to calculate transactions per second (TPS) rates and/or counters based upon an interval and data value.

A computer platform application as described herein may be implemented on any operating system, such as Unix® or Windows®. Java® and associated application programming interface (API) toolkits, such as Swing™, are useful in creating a graphical user interface (GUI) and result display screens, such as performance graphs. The choice of computer platforms for implementing the exemplary applications as described below is a matter of design choice and may be influenced by the operating system upon which the application will be used.

Figure 2:
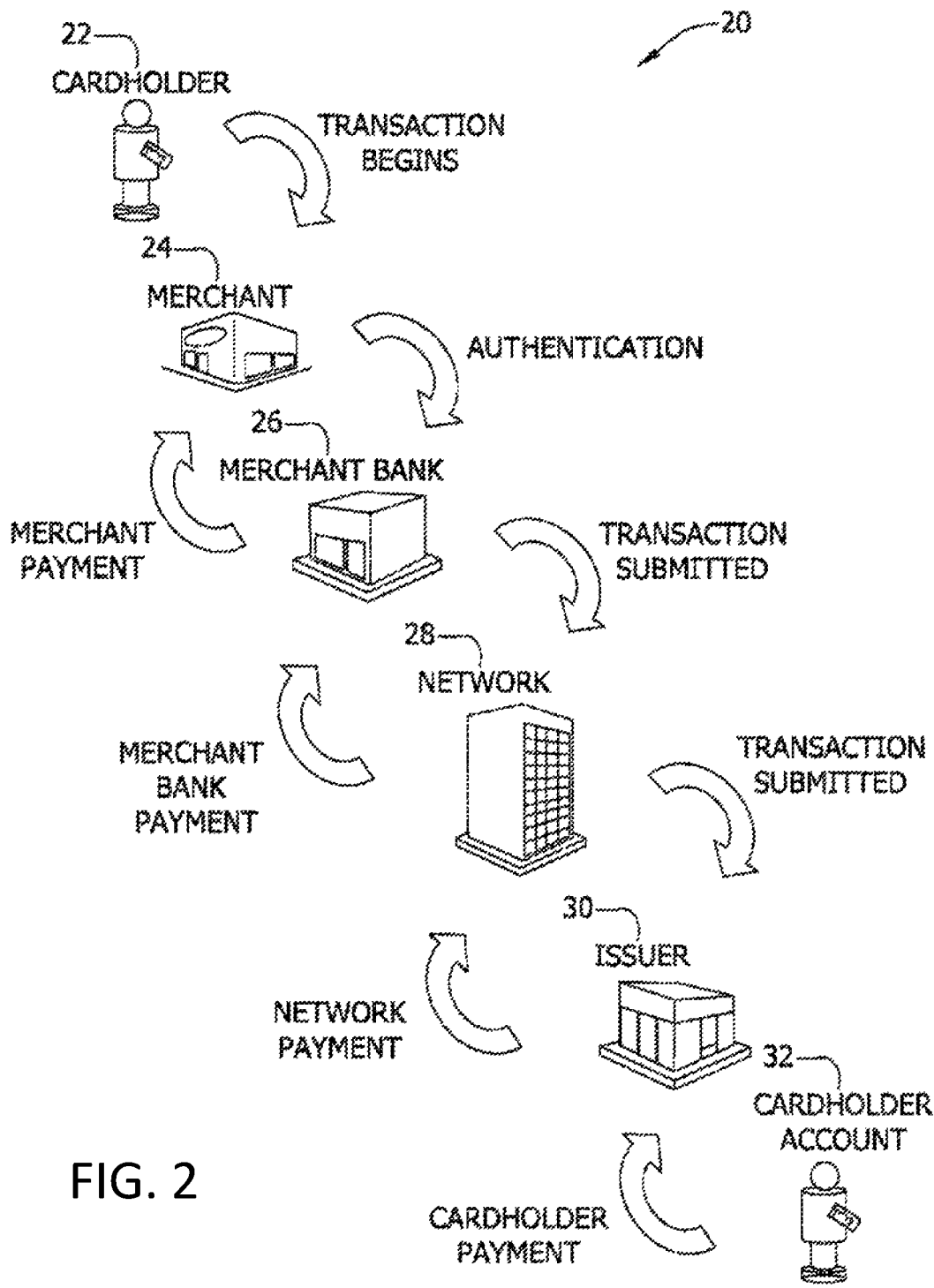
FIG. 2 is a flowchart 20 illustrating a typical financial transaction.

FIG. 2 is a flowchart 20 illustrating a typical financial transaction using a financial transaction card payment system. Systems, methods, and apparatus as described herein may be deployed within such a financial transaction card payment system: for example, within a credit card payment system using the MasterCard® interchange. The MasterCard® interchange is a proprietary communications standard promulgated by MasterCard International® Incorporated for the exchange of financial transaction data between financial institutions that are members of MasterCard International Incorporated®. Communications among the various entities within a financial transaction card payment system are typically conducted via message queues carrying ISO 8583 messages, which are described in more detail below. For example, network 28 may use message queues to route messages from acquirers 26 to issuers 30, from issuers 30 to acquirers 26, etc.

In a typical financial payment system, a financial institution called the "issuer" issues a financial transaction card, such as a credit card, to a consumer, who uses the financial transaction card to tender payment for a purchase from a merchant. To accept payment with the financial transaction card, the merchant must normally establish an account with a financial institution that is part of the financial payment system. This financial institution is usually called the "merchant bank" or the "acquiring bank" or "acquirer bank." When a consumer 22 tenders payment for a purchase with a financial transaction card, the merchant 24 requests authorization from the merchant bank 26 for the amount of the purchase. The request may be performed over the telephone, but is usually performed through the use of a point-of-sale terminal, which reads the consumer's account information from the magnetic stripe or chip on the financial transaction card (or, for example, from a secure application executing on the customer's smartphone) and communicates electronically with the transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor."

Using the interchange 28, the computers of the merchant bank or the merchant processor will communicate with the computers of the issuer bank 30 to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account 32 is decreased. Normally, a charge is not posted immediately to a consumer's account because bankcard associations, such as MasterCard International® Incorporated, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which are settled as a group.

Financial transaction cards or payment cards can refer to credit cards, debit cards, and prepaid cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs.

Figure 3:
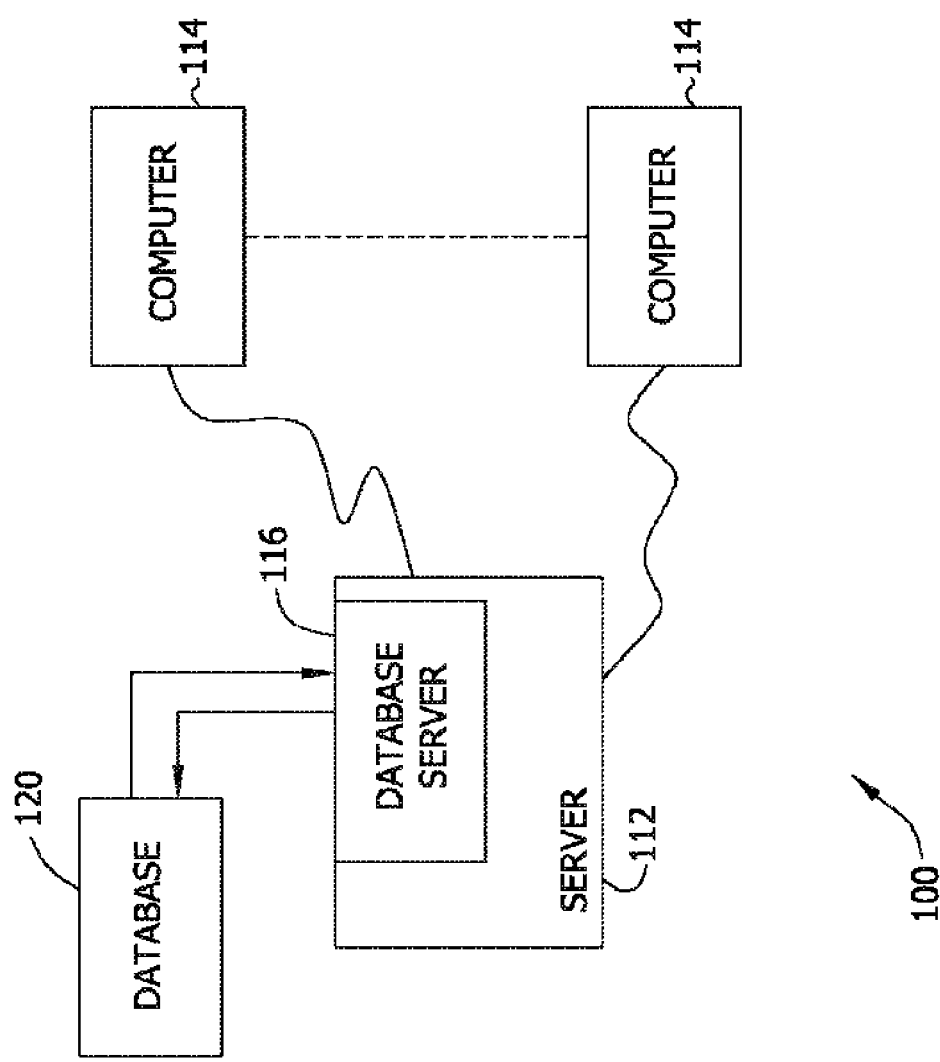
FIG. 3 is a simplified block diagram of an exemplary system 100.

FIG. 3 is a simplified block diagram of an exemplary system 100 within which methods and apparatus for monitoring flow of a data stream (e.g., flow of a message queue) as described herein may be implemented. In one embodiment, system 100 is the financial transaction card payment system shown in FIG. 2, which can be utilized for providing a decision making platform. More specifically, in the example embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in connections, cable modems and special high-speed ISDN lines. Client systems 114 could be any device capable of interconnecting to the Internet including a web-based phone, personal digital assistant (PDA), or other web-based connectable equipment. A database server 116 is connected to a database 120 containing information on a variety of matters (e.g., fraud prevention, rewards programs, parental spending controls, etc.). Server 116 is typically implemented as hardware executing a database management system (DBMS). In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be noncentralized.

Figure 4:
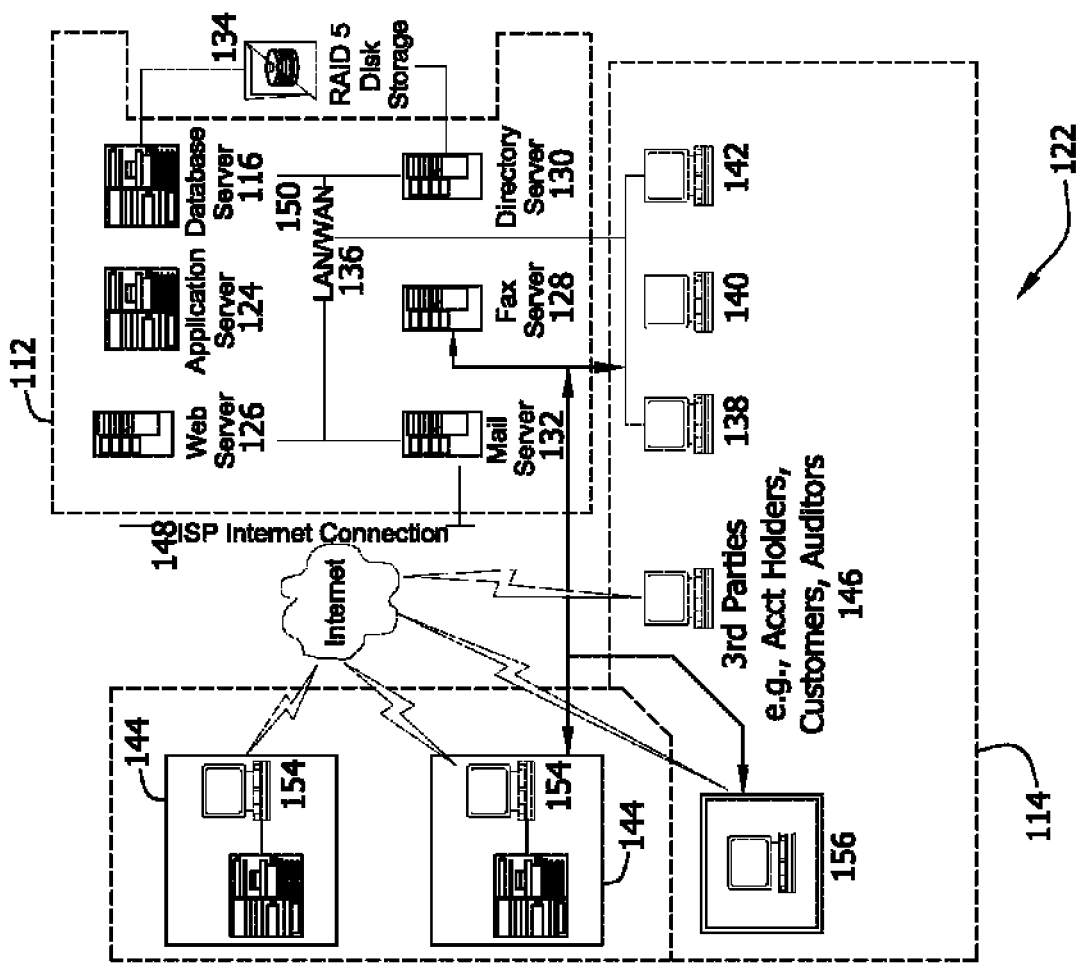
FIG. 4 is an expanded block diagram of an exemplary embodiment of a server architecture.

FIG. 4 is an expanded block diagram of an exemplary embodiment of a server architecture of a system 122 within which methods and apparatus for monitoring flow of a data stream (e.g., flow of a message queue) as described herein may be implemented. Components in system 122, identical to components of system 100 (shown in FIG. 3), are identified in FIG. 4 using the same reference numerals as used in FIG. 3. System 122 includes server system 112 and client systems 114. Server system 112 further includes database server 116, an application server 124, a web server 126, a fax server 128, a directory server 130, and a mail server 132. A disk storage unit 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., auditors, 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

One example of a messaging standard that may be used with a message queue is the International Organization for Standardization standard ISO 8583 ("Financial transaction card originated messages—Interchange message specifications"). The ISO 8583 standard may be used, for example, to carry messages among entities in a network for processing financial transactions (e.g., among the various entities shown in FIG. 2, such as merchant 24, acquirer 26, interchange 28, and issuer 30). The format for an ISO 8583 message is specified in Part 1 (ISO 8583-1, "Messages, data elements and code values") of the standard.

As shown in FIG. 5A, an ISO 8583 message contains three principal parts. The first part is a four-bit field called a message type indicator (MTI), which indicates the type of transaction, such as credit, debit, authorization, etc. For example, an MTI of 0100 indicates an authorization request originated by an acquirer, an MTI of 0110 indicates a response to such an authorization request, an MTI of 0200 indicates a financial request originated by an acquirer, etc. The value at position one of the MTI specifies a version of the standard with which the message is compliant, with "0" indicating the 1987 version of ISO 8583-1, "1" indicating the 1993 version of ISO 8583-1, and "2" indicating the 2003 version of ISO 8583-1. The second and third parts of an ISO 8583 message have variable lengths, so that the message itself has a variable length.

The second part of an ISO 8583 message contains one or more 64-bit bitmaps that indicate which data elements are present in the message. The second bit of this part indicates whether the message contains a second 64-bit bitmap, and in some cases the message may also contain a third 64-bit bitmap.

The last part of an ISO 8583 message contains the data elements (or data fields) whose presence is indicated by the bitmap(s). A data element may have a fixed or variable length, and the various data elements may have different formats from each other (e.g., numeric, alphanumeric, binary, etc.). Examples of the data elements that may be present in an ISO 8583 message include: primary account number (data field 2), transaction amount (data field 4), local transaction time and date (data fields 12 and 13), merchant type (data field 18), acquirer country code (data field 19), acquirer identification code (data field 32), response code (data field 39).

It may be desirable to perform efficient processing for grouping and operational statistics for financial transaction data based upon ISO 8583 on a network (e.g., as shown in FIG. 3 and/or FIG. 4). For example, it may be desirable to calculate TPS rates and/or counters based upon an interval and data value.

A platform for processing financial transaction messages may include one or more databases (e.g., instances of database 120) for storing messages that are carried over the various queues. In one such example, messages are read from a message queue and deconstructed (e.g., by parsing the message into its various fields, including the MTI and any data fields), and the fields of the deconstructed message are then stored to corresponding columns of an entry (or row) of a database table 'financial transaction'. Performance monitoring may be implemented on such a table using queries. For example, FIG. 1C shows an example of a query in SQL (Structured Query Language). In this example, MTI is the message type indicator, and 1440=60*24 indicates the number of minutes in a day. The response to this query indicates the number, among the table entries that have transaction dates within the last five minutes, of each type of MTI. Such information may be used to obtain an average rate at which a particular type of message is being processed.

To reduce I/O access, it may be desirable to implement such a database query using an index-based access path, although additional storage space will be required for the index. For many typical network applications, it may be expected that incoming messages will be received at a rate of thousands per second, so that the database table may be very large. In a platform for processing payment card transactions, for example, the rate of incoming transactions typically ranges from 800 (eight hundred) to 5000 (five thousand) per second, and a rate of about 4-5K TPS may be expected at any time. Even when an index-based access path is implemented, responding to a query on a very large database table may require churning through a great deal of data. Using such a query-based scheme to monitor a processing rate over time also requires re-execution of the query at regular intervals. Moreover, providing support in the same manner for monitoring rates at which different message fields are being processed may require periodically repeating multiple similar queries, as well as providing storage for the multiple corresponding indexes.

For an enterprise-level application, the size of the database table being queried may typically be millions or even billions of rows, such that executing each instance of the query may involve tens of thousands, or hundreds of thousands or more, of disk reads. It may be desired to obtain such metrics (e.g., for network monitoring and analytics) in a message-oriented system but also to avoid overhead costs associated with frequent queries to a large database. Systems, methods, and apparatus are described herein that may be configured to read message data before it enters the database. Such embodiments can be used to provide a massive reduction in system overhead as compared to a query-based monitoring scheme as described above.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

Figure 6:
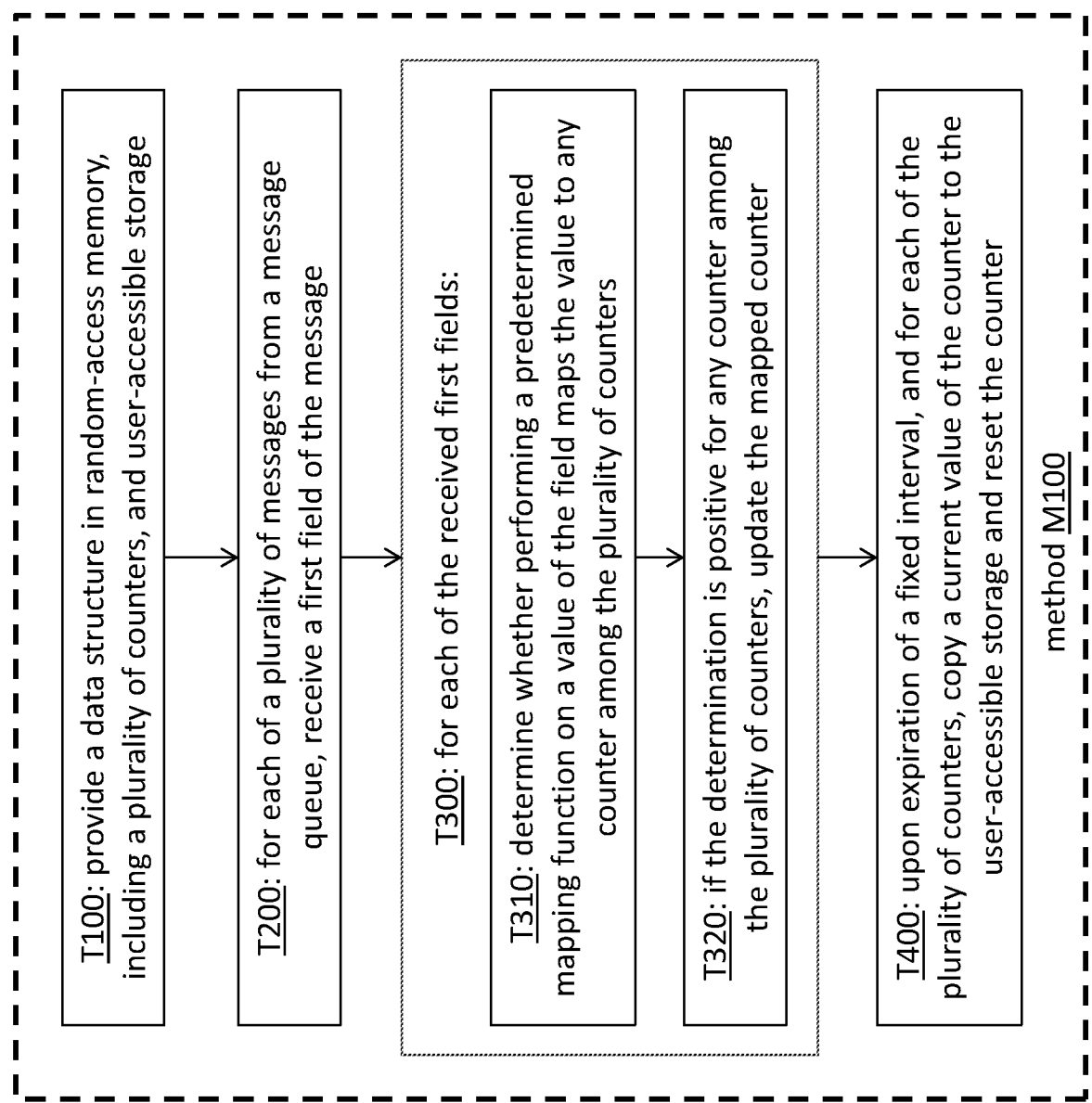
FIG. 6 shows a flowchart for a method M100 of monitoring a data stream that includes tasks T100, T200, T300, and T400.

FIG. 6 shows a flowchart for a method M100 of monitoring a data stream that includes tasks T100, T200, T300, and T400. Task T100 provides a data structure in random-access memory, including a plurality of counters, and a user-accessible data structure that is separate from the data structure. For each of a plurality of transfer units from the data stream, task T200 receives a first field of the transfer unit. As described at length herein, the data stream may be a message queue, and the plurality of transfer units may be messages from such a queue. More generally, however, method M100 may be implemented to monitor any data stream that includes a plurality of transfer units that have defined fields (e.g., packets, frames, etc.). Task T300, which includes subtasks T310 and T320, executes for each of the first fields. For each of the first fields, task T310 determines whether performing a predetermined mapping function on a value of the field maps the value to any counter among the plurality of counters. If the determination by task T310 is positive for any counter among the plurality of counters, task T320 increments the mapped counter. Upon expiration of a predetermined interval, and for each of the plurality of counters, task T400 copies a current value of the counter to the user-accessible storage and resets the counter.

The table of FIG. 7A shows an example of task T300 in a message-queue context. The left column shows the values of the incoming fields (in this example, the MTI of each message), and the right column shows the action taken by task T300. In response to an MTI of 0100, task T300 increments a corresponding bucket. In response to an MTI of 0200 or 0210, task T300 increments a different corresponding bucket. In this example, task T300 maps MTIs of 0200 and 0210 to the same bucket. The table of FIG. 7B shows a different example of task T300, which maps MTIs of 0200 to a bucket but does not map MTIs of 0210 to any bucket.

Modern databases typically utilize a journaling mechanism to provide recovery of the data once committed. For each change to the database, such a mechanism may record an entry that includes timestamp and ordering information, along with the data for the change. This change includes the various fields or columns for the table. For a case in which the parsed messages are stored to a database table that is a logging table, method M100 may be implemented to obtain the desired field(s) for each message by parsing the database journal logs.

Such a method may utilize this journal data to provide the functionality for a query as in FIG. 1C, but stored in memory and available in real time. The corresponding field(s) may be read into memory and mapped to corresponding counters. For example, such a counter may be incremented when a corresponding column value is found or encountered in the stream. A typical implementation of method M100 may include about one hundred buckets. Task T300 may be implemented to map the values of one field to many different corresponding buckets (e.g., twenty or thirty) and to map the values of another field to only a few different corresponding buckets (e.g., three or five). Depending on the particular network behaviors that it is desired to monitor (and/or to ignore), task T300 may be implemented to map a particular value of a field to one bucket, to more than one bucket, or to no buckets at all.

FIGS. 8A and 8B show an example use of method M100 to monitor rates of MTI 0100 and 0200 at an interval of five seconds. The table in FIG. 8A shows a second-by-second recording of the number of observed MTIs of value 0100, the number of observed MTIs of value 0200, and the running count of the corresponding buckets. At a five-second refresh interval, the current running counts are stored to user-accessible storage, and the counters are reset to zero. FIG. 8B shows the values of the user-accessible copies after each refresh event.

In such manner, method M100 may be implemented to provide an indication, in real time, of the rates at which different types of messages are currently being read from the queue. If a user asks at time 01:10:04, "what is my current TPS rate for MTI 0100?," the response would be zero, as the initial time interval has not yet been calculated. If at time 01:10:06 the user asks again, "what is my current TPS rate for MTI 0100?," the response would be the most recent copied value for MTI 0100 (15) divided by the interval period of five seconds, or 3 TPS. If at time 01:10:12 the user asks again, "what is my current TPS rate for MTI 0100?," the response would be the most recent copied value for MTI 0100 (40) divided by the interval period of five seconds, or 8 TPS. The copied values may also be displayed to one or more users, used to construct and/or update graphical indications of network activity (e.g., graphs, charts), and/or used as input to an indicator widget (e.g., a speedometer or RAM gauge). For example, it may be desired to display the current value of a counter, to display changes in the value of a counter over time, and/or to display a relation (e.g., a difference or a ratio) between the values of two different counters.

Figure 9:
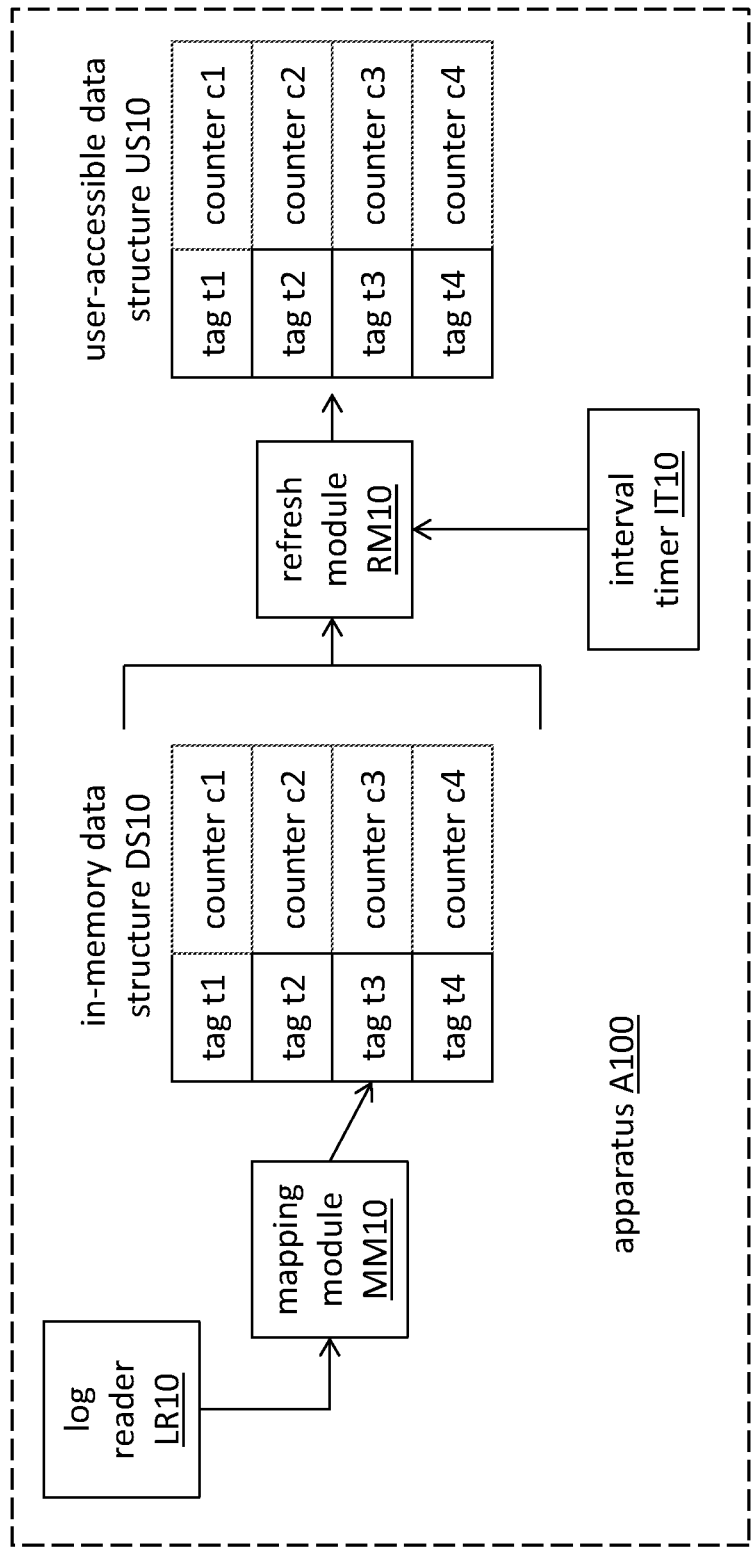
FIG. 9 shows a block diagram for an apparatus A100 for monitoring a data stream according to one example.

FIG. 9 shows a block diagram for an apparatus A100 for monitoring a data stream according to one example. Apparatus A100 includes a log reader LR10, a mapping module MM10, an in-memory data structure DS10 that includes a plurality of counters, a user-accessible data structure US10 that is separate from data structure DS10, a refresh module RM10, and an interval timer IT10. Log reader LR10 reads a log file (e.g., a database log file) having a plurality of transfer units (e.g., parsed messages), where each transfer unit includes a plurality n of fields, to output a first field for each of a plurality of the transfer units. Mapping module MM10 receives the first fields and performs a predetermined mapping function for each of the received first fields. For each of the received first fields, module MM10 determines whether performing the predetermined mapping function on a value of the field maps the value to any counter among the plurality of counters. If this determination is positive for any counter among the plurality of counters, module MM10 updates (e.g., increments) the mapped counter.

Mapping module MM10 may be implemented to use a hash function to map field values (also called 'keys') to corresponding counters (also called 'buckets'). In some cases, the hash function may map several different keys to the same bucket. Alternatively or additionally, mapping module MM10 may map one or more keys to no buckets.

In-memory data structure DS10 may be implemented using, for example, a linked list or a fixed array in memory. FIG. 5B shows an example of a linked list implementation, in which each entry includes one of tags t1-t4, the corresponding one of counters c1-c4, and a corresponding one of pointers p1-p4 that each point to the next tag. The last pointer (here, pointer p4) has a null value, and the list also includes a head pointer p0 (not shown) that points to the first tag (here, to tag t1). One advantage of such a structure is that additional entries (e.g., other field values to count) may be easily added, and/or existing entries may be easily removed, by updating the corresponding pointers. FIG. 5C shows an example in which the third entry is removed from the list and a fifth entry is added.

Consider an example in which the in-memory data structure DS10 stores a structure MTI[5][ValsCntr]. It may be desired to implement the ValsCntr portion dynamically, since the range of values to be encountered may not be known during the program's compile phase. So given we would retain 5 minutes of data MTI[5] in this example, mapping module MM10 would map each MTI to a corresponding hash structure for O(1) value retrieval.

It may be desired to support performing retrieval or reading of the counter values while apparatus A100 continues to process incoming data fields. In such case, it may be desired to provide some level of synchronization to ensure that the read of a counter value is atomic. This can be performed by including a mechanism to copy the current structures as part of the rotation and/or reuse of the current memory structures. Upon expiration of a predetermined interval (e.g., 5 seconds, 10 seconds, 30 seconds, 1 minute, 1 hour, 1 day, etc.) as indicated by interval timer IT10, and for each of the plurality of counters of in-memory data structure DS10, refresh module RM10 copies a current value of the counter to user-accessible data structure US10 (e.g., in a user-accessible portion of the random-access memory space) and resets the in-memory counter to an initial value (e.g., zero). It is also possible, if desired, to implement apparatus A100 to include multiple instances of refresh module RM10 and interval timer IT10 such that different refresh intervals may be provided for different counters (e.g., for different values of the field being mapped).

Typically, the tag values will not change and do not need to be re-copied from structure DS10 to structure US10 at each refresh interval. Note that unless it is desired to search user-accessible data structure US10 by field value, it is also not necessary for tag values of user-accessible data structure US10 to be the same as the tag values of in-memory data structure DS10. In many cases, in fact, the meaning of each counter value in user-accessible data structure US10 will be known a priori by the user, such that structure US10 may be implemented without any tag values at all.

Figure 10B:
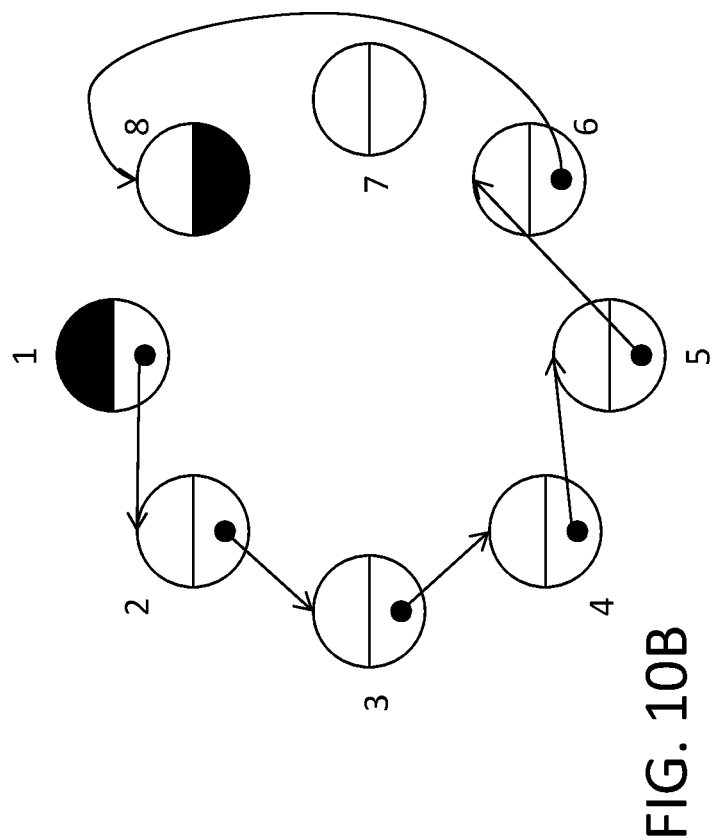
FIGS. 10A and 10B show examples of a round-robin scheme.
Figure 10A:
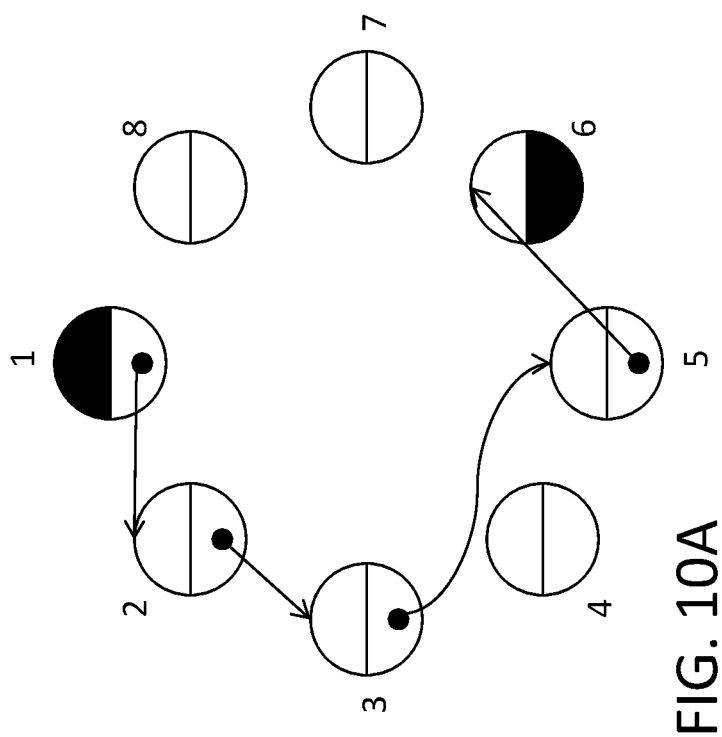

In a typical monitoring application, the counter values are transient in nature and do not require persistence, such that method M100 may be implemented without providing recovery for historical data. In this case, storage is needed only for the message data for the most current interval period and for the counter data structure (and possibly for the user-accessible data structure). For an implementation in which it is desired to monitor a configurable number of different fields (e.g., as described below with reference to FIG. 11), storage of the data structures may be implemented as a configurable number of history groups, where each group includes an instance of a counter data structure (e.g., DS10) and possibly a corresponding user-accessible structure (e.g., US10). These groups could be configured in a round robin fashion to avoid dynamic memory allocation. FIG. 10A shows an example of such a round-robin scheme in which nodes 1, 2, 3, 5, and 6 store corresponding history groups and each of active nodes 1, 2, 3, and 5 points to the next active node. FIG. 10B shows another example of this scheme in which nodes 4 and 8 are also active.

During the interval period (e.g., 60 seconds), the user-accessible read memory (e.g., data structure US10) would remain static and would be refreshed each period. Such a refresh mechanism may be implemented to allow any number of incoming processes to read a current version of the data with low impact to the active memory region (e.g., in-memory data structure DS10) that is keeping track of the real-time calculations. Apparatus A100 may be used to obtain a result similar to the 'group by' performed in the SQL query of FIG. 1C, but the performance is now dramatically improved since the calculations for the group are performed in random-access memory, without the large disk overhead associated with the query, to obtain results that may be refreshed in real time.

It may be desired to monitor rates for more than one of the fields that may appear in a transfer unit of the data stream being monitored. For example, an implementation of method M100 or apparatus A100 as described herein may be used to monitor rate (e.g., TPS) for particular values of message type indicator (MTI). Additionally or alternatively, it may be desired to monitor rates for one or more other fields of messages in the queue. In a queue of ISO 8583 messages, for example, it may be desirable to monitor TPS for fields such as country code and/or device type identifier. Detecting a sudden decrease in messages received from a country, a geographical region, or a particular customer may allow diagnosis of a network problem to begin before the problem has even been reported. One common cause for a disruption of data traffic between two locations is damage to a cable during an excavation. Detecting an unusually high rate of messages received (e.g., a rate much greater than one transaction per minute for a single device, such as from an automated teller machine (ATM) device) may also support a rapid response to a device malfunction or potential fraudulent activity, allowing damage to be minimized. (It should be noted that in at least some implementations of method M100, the particular data stream being monitored may include transfer units that do not contain a particular field being mapped. For a case in which two different fields are being mapped, for example, it is possible that any one transfer unit will include none of the fields, only one of the fields, or both of the fields. In another such case, all of the transfer units include one of the fields (e.g., an MTI) and may optionally include the other field. In a further case, all of the transfer units in the data stream include both fields.)

Figure 11:
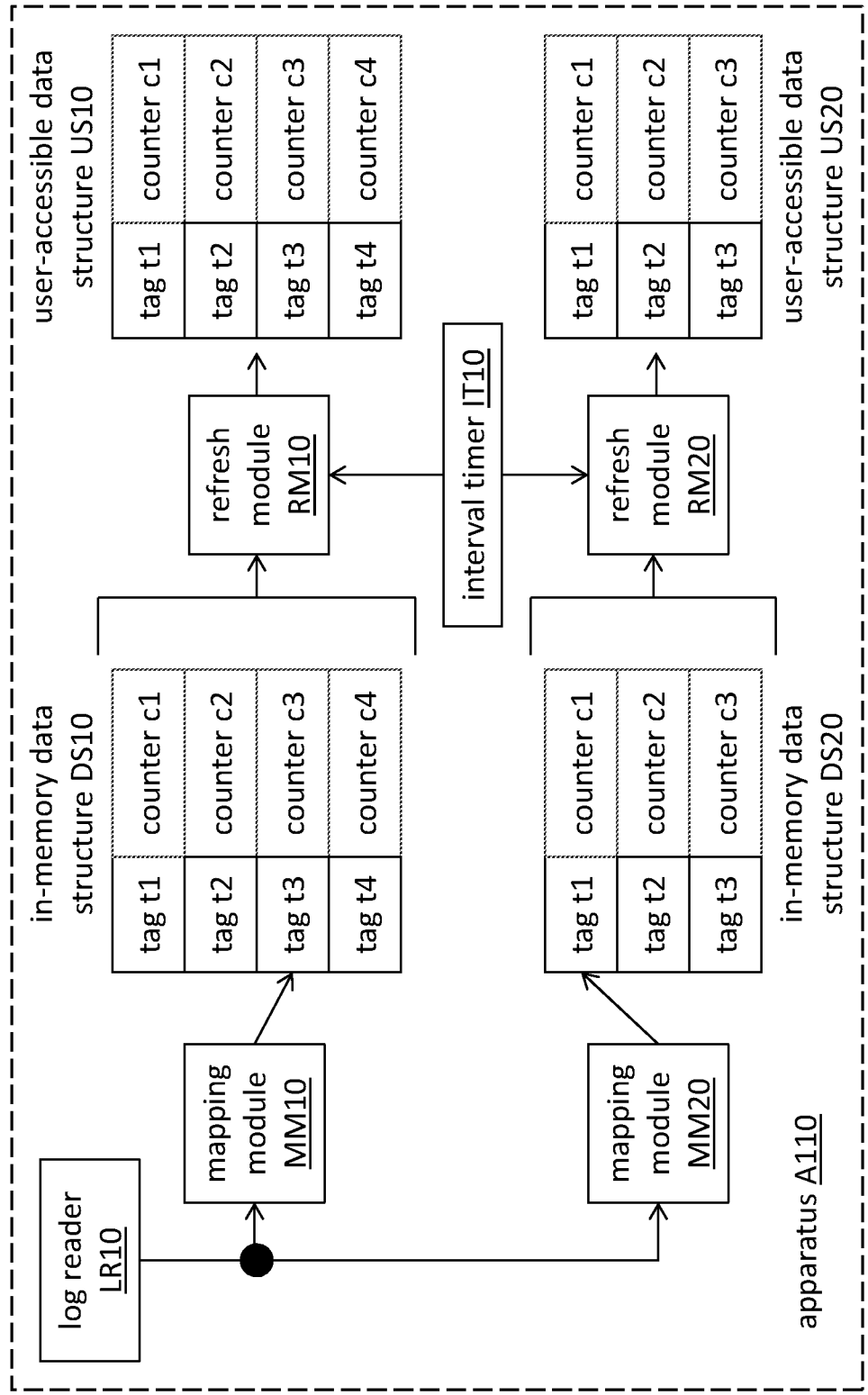
FIG. 11 shows an implementation A110 of apparatus A100.

FIG. 11 shows an implementation A110 of apparatus A100 that may be used to monitor the values of more than one field of the transfer units in a data stream (e.g., messages in a queue). Apparatus A110 includes another instance MM20 of mapping module MM10 that is configured to map values of a second field of each transfer unit to corresponding counters of an instance DS20 of in-memory data structure DS10. In this example, structure DS20 has fewer counters than structure DS10, although it may be implemented to have more counters or the same number of counters as structure DS10 according to the nature of the field to be monitored and the particular monitoring behavior that is desired. A second instance RM20 of refresh module RM10 is configured to copy the counter values of structure DS20 to an instance US20 of user-accessible structure US10 in response to an indication from interval timer IT10 that the refresh interval has expired. In another implementation, a second instance of timer IT10 may be provided instead such that the refresh period for the second field may be different than for the first field. Apparatus A200 as described below may be similarly implemented to include multiple instances of mapping module MM10, data structures DS10 and US10, and refresh module RM10 (and of interval timer IT10 if desired).

Apparatus A100 (e.g., A110) may be implemented to include one or more alerts to indicate that a value of a counter has exceeded (alternatively, is at least equal to) a corresponding threshold value. In one such example, a polling mechanism is configured to perform the comparison(s) upon refresh of the user-accessible storage. It may be desired to implement two or more thresholds for a counter (e.g., a low threshold to indicate a warning, and a higher threshold to indicate a danger condition). Additionally or alternatively, such an alert may be configured to indicate when a condition has persisted over multiple refresh periods (e.g., multiple consecutive periods). Other types of alert conditions to be monitored may include, for example, the magnitude of a difference or ratio between two particular counter values. Typically, the first response to an unexpected or undesirable counter value would be to examine the other fields in the data stream being monitored. Accordingly, apparatus A100 may be implemented to prompt a display of one or more other fields of the incoming data stream (e.g., a field indicating a source or destination of the transfer unit) in response to detection of an alert condition.

Figure 12:
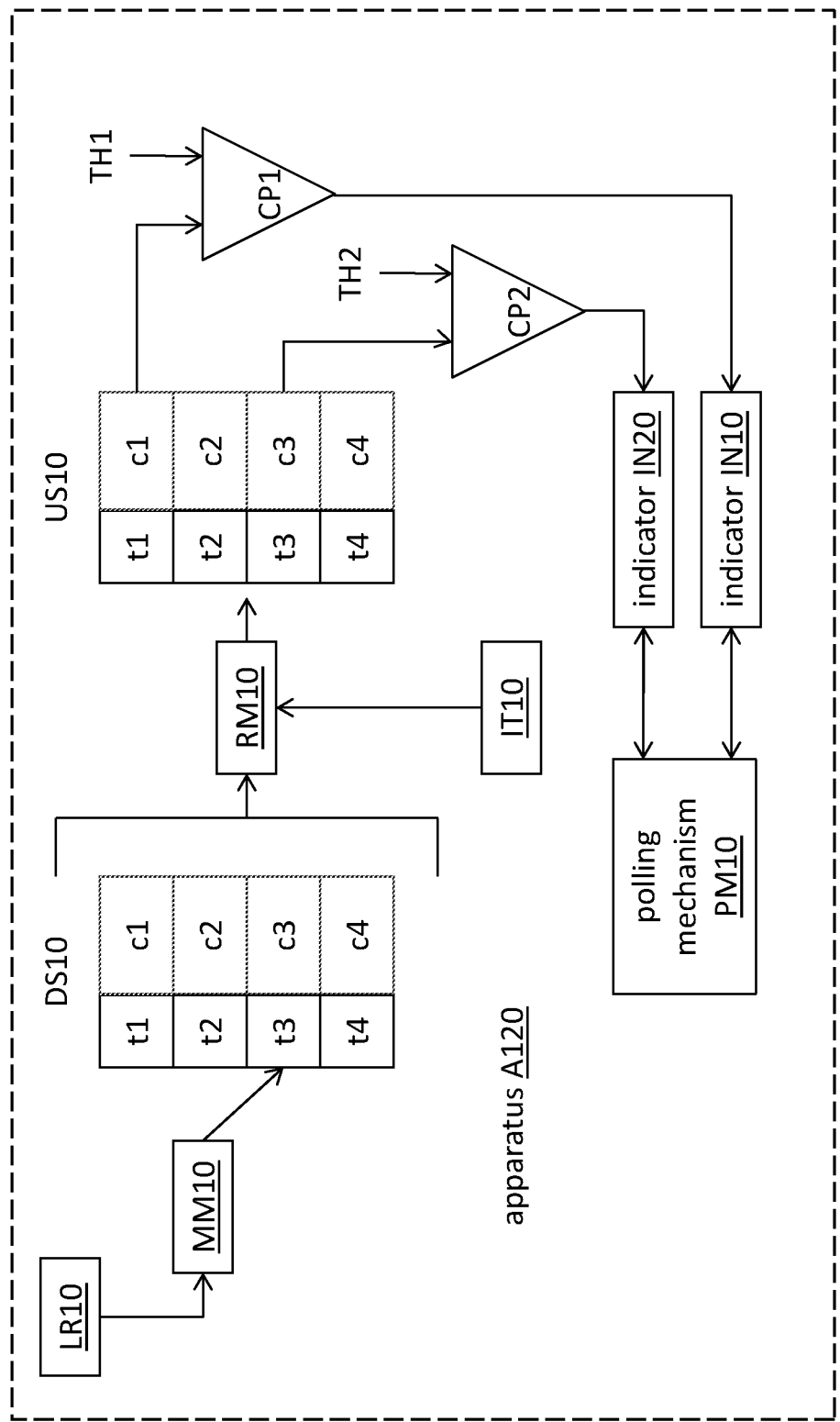
FIG. 12 shows a block diagram of an implementation A120 of apparatus A100.

FIG. 12 shows a block diagram of an implementation A120 of apparatus A100 that includes comparators CP1 and CP2, indicators IN10 and IN20, and a polling mechanism PM10. Comparator CP10 is configured to compare the user-accessible copy of counter c1 to a threshold value TH1 and to store the result in indicator IN10. For example, the stored value of indicator IN10 may indicate whether or not the value of counter c1 exceeds (alternatively, is at least equal to) the value TH1. Comparator CP20 is similarly configured to compare the user-accessible copy of counter c3 to a threshold value TH2 and to store the result in indicator IN20. Polling mechanism PM10 is configured to poll each of the indicators IN10 and IN20 after each refresh event and to report when a predetermined condition is detected (e.g., that either indicator has been set, or that both indicators have been set). Apparatus A200 as described below may be similarly implemented to include comparators CP1 and CP2, indicators IN10 and IN20, and a polling mechanism PM10.

Figure 13:
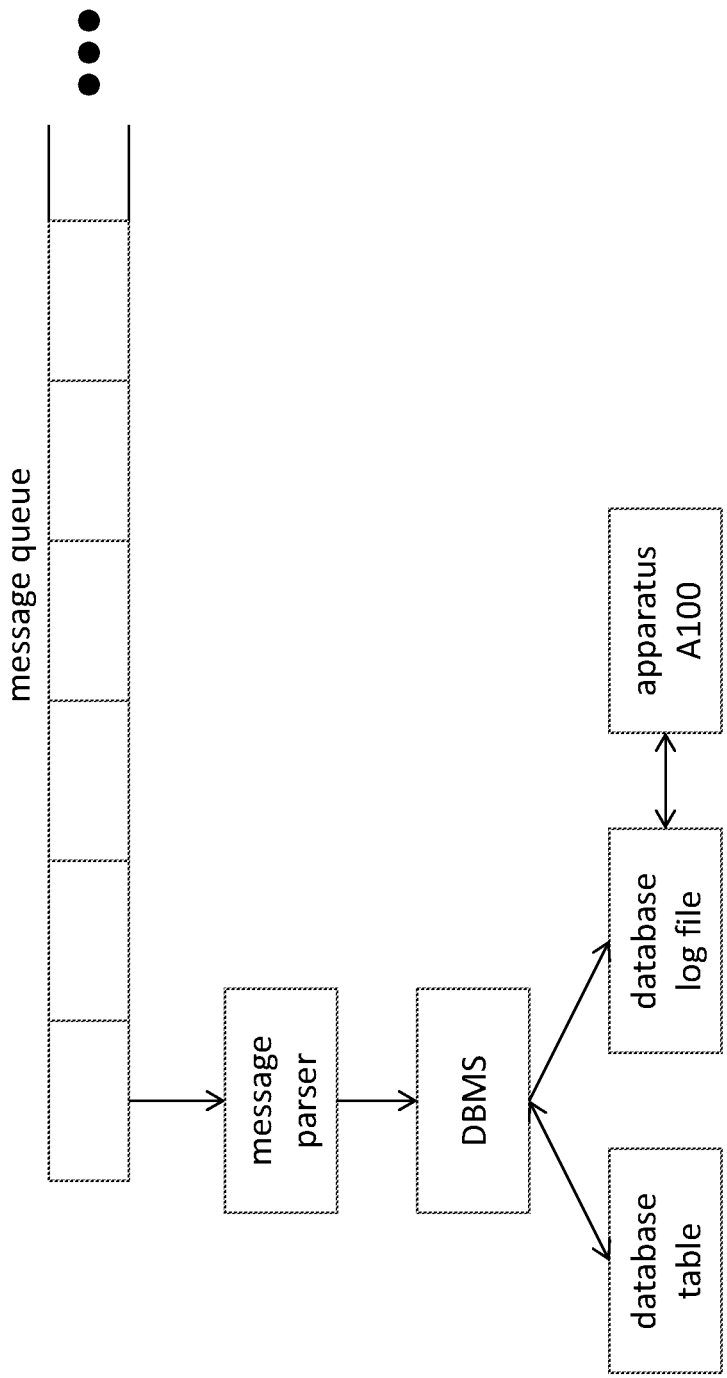
FIG. 13 shows a block diagram of an application of apparatus A100.

FIG. 13 shows a block diagram of an application of apparatus A100. A message parser reads messages from a message queue, parses the messages (e.g., by reading the bitmap of each message to determine which data fields are present), and outputs the parsed messages to a database management system (DBMS). The DBMS stores the parsed messages to a database table and updates a corresponding database log file. The DBMS may be implemented so that all changes to the database are recorded in the log file, at least temporarily. Once a change has committed and the changed page has been written to disk, the log record is no longer needed. In such a case, log reader LR10 may be configured to read the desired field(s) from the log record prior to the commit.

Alternatively, a DBMS may be implemented to write changes directly into the database table, and to write a copy of the original unchanged database content into a separate rollback journal file. In the event of a crash or a ROLLBACK command, the original state of the database table is restored by playing the original content from the rollback journal back into the database table. Changes to the database table are committed in this case by deleting the rollback journal. In such an application, the parsed messages may not be available to log reader LR10.

Figure 14:
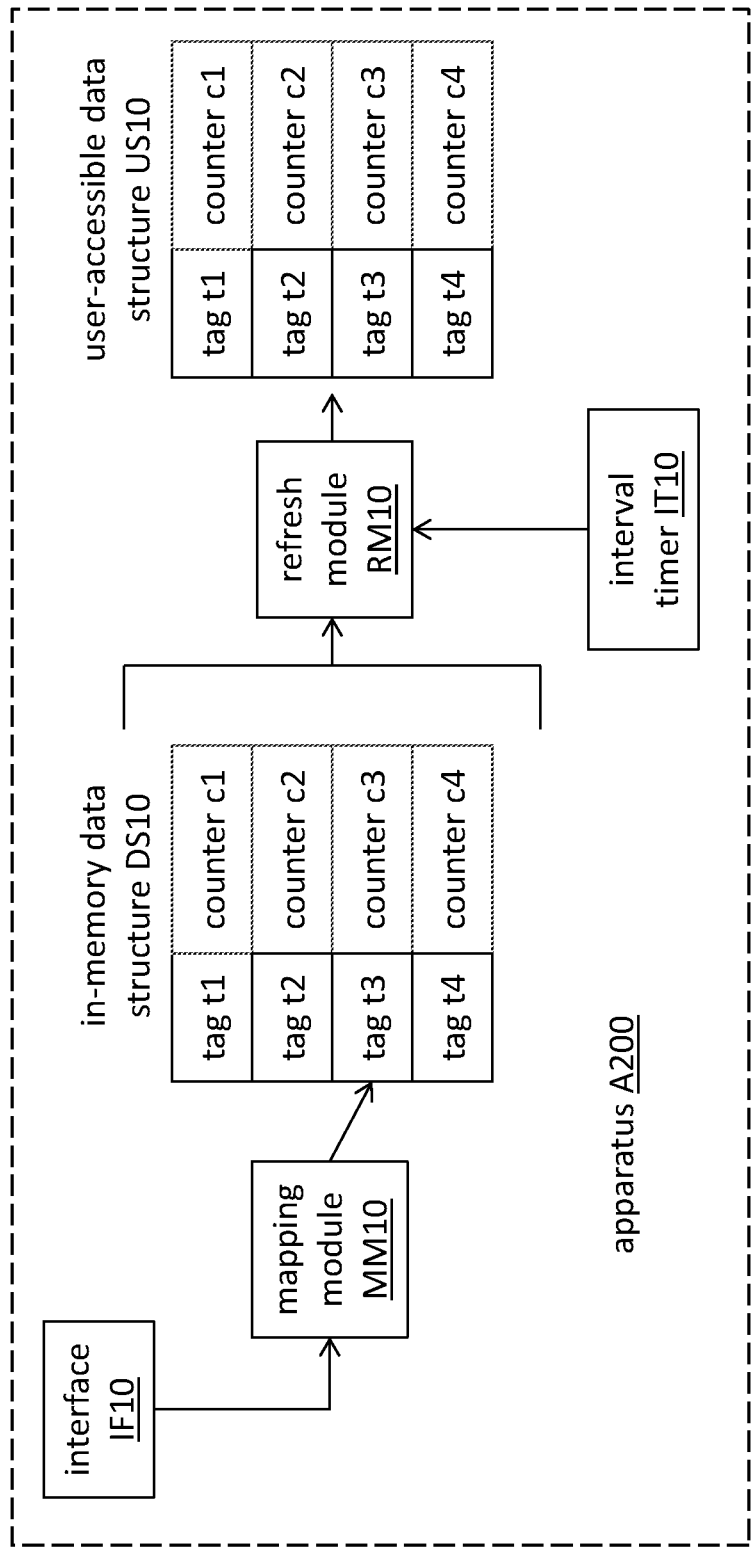
FIG. 14 shows a block diagram for an apparatus A200 for monitoring a data stream according to another example.

An alternate implementation of method M100 may use an application programming interface (API) to receive the transfer units (e.g., to log the transactional data). This API may be implemented to support performing the same calculations in real time and in memory within a centralized memory repository. FIG. 14 shows a block diagram of an apparatus A200 that may be used to perform such an implementation of method M100. Apparatus A200 includes an API IF10 that obtains the desired field(s) of the transfer units (e.g., parsed messages) from a calling application (e.g., the DBMS) in response to a function call. Such an API provides a generic mechanism for obtaining the data field(s) via function calls from any application with which it is desired to implement monitoring as described herein. In a database context, such an implementation may be used even in a case as described above in which the DBMS writes changes directly to the database table.

Figure 15:
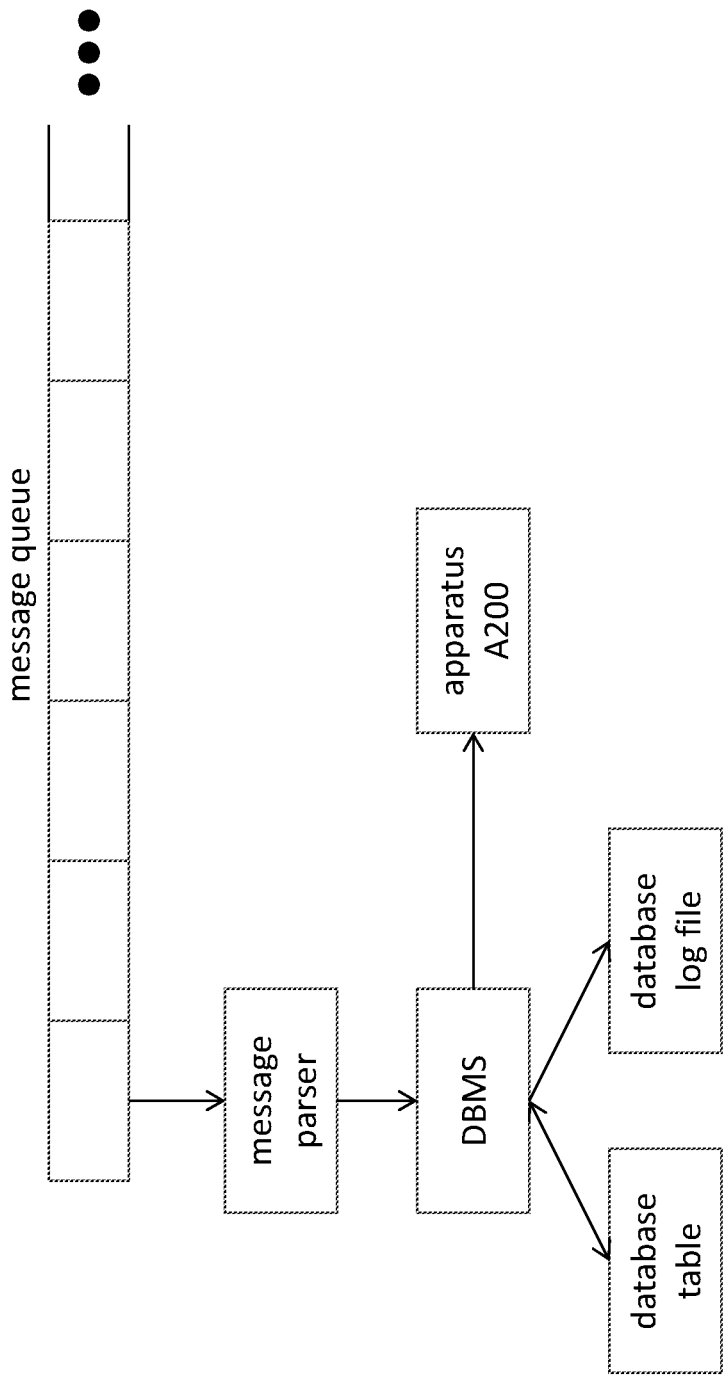
FIG. 15 shows a block diagram of an application of apparatus A200.

The DBMS may be configured to perform a call to interface IF10 when a write to the database occurs, as shown in FIG. 15. Such a call may be implemented within the message-storing routine by, for example, including a TRIGGER statement that fires when an INSERT statement for the table is encountered. Such a TRIGGER, which may be implemented to fire BEFORE or AFTER the INSERT (typically, AFTER the INSERT), is configured to include an EXEC statement to execute a stored procedure, where the stored procedure includes a call to interface IF10 as an external function call. Such a TRIGGER may be implemented, for example, using a procedural extension for a database programming language, such as PL/SQL (Procedural Language/Structured Query Language) (Oracle Corp.). Alternatively, log reader LR10, or a message parser as shown in FIG. 13 or 15, may be implemented to pass the desired field(s) via function calls to interface IF10.

Yet another variant of method M100 may be configured to utilize an incoming data stream. Such an implementation may be configured, for example, to receive the parsed messages via any queuing technology, such as IBM® MQ or Oracle® AQ, or even to attach directly to a network device to read the TCP/IP packets. In general, the various implementations of method M100 and apparatus A100 as described herein may be applied to any data stream having transfer units with defined fields. The fields may be defined by a positional dependence (e.g., the first four positions of an ISO 8583 message define the MTI), by delimiters (e.g., as in a comma-separated value or CSV data stream), and/or by a contextual dependence (e.g., as expressed in an ISO 8583 bitmap). Such an implementation may include performing parsing of the transfer units (e.g., messages) to provide input data to the process of mapping the data fields to the corresponding in-memory counters, although in general it may be desired to leave the task of parsing the transfer units to the calling application.

An apparatus as disclosed herein (e.g., apparatus A100, A110, A120, and/or A200) may be implemented in any combination of hardware with software, and/or with firmware, that is deemed suitable for the intended application. It is noted that the various methods disclosed herein (e.g., any among implementations of method M100) may be performed by one or more processors. The implementations of methods, schemes, and techniques disclosed herein (e.g., of method M100) may also be embodied, in one or more computer-readable storage media, as one or more sets of instructions readable and/or executable by one or more processors, such that the instructions cause one or more processors executing the instructions to perform the acts of such a method as disclosed herein. Such a storage medium may be a conventional read/write memory such as a magnetic disk, floppy disk, optical disc, compact-disc read-only-memory (CD-ROM), digital versatile disc (DVD), Blu-ray Disc™, magneto-optical storage, flash memory, random-access memory, transistor-based memory, magnetic tape, and/or any other non-transitory computer-readable memory device as is known in the art for storing and retrieving data. Significantly, such computer-readable storage media may be remotely located from such one or more processors and may be connected to such one or more processors via a network such as a local area network (LAN), a wide area network (WAN), or the Internet.

It is understood by those skilled in the art that instructions for such method embodiments may be stored on their respective computer-readable memory and executed by their respective processors. It is understood by those skilled in the art that other equivalent implementations can exist without departing from the spirit or claims of the invention.

The previous description of the embodiments is provided to enable any person skilled in the art to practice the disclosure. The various modifications to these embodiments will be readily apparent to those skilled in the art, and the generic principles defined herein may be applied to other embodiments without the use of inventive faculty. Thus, the present disclosure is not intended to be limited to the embodiments shown herein, but is to be accorded the widest scope consistent with the principles and novel features disclosed herein.

What is claimed is:

1. A method of monitoring a data stream, said method comprising:
   providing a data structure in random-access memory, including a plurality of counters, and a user-accessible data structure that is separate from the data structure;
   for each of a plurality of transfer units from the data stream, receiving a first field of the transfer unit;
   for each of the received first fields:
      determining whether a value of the field corresponds to any counter among the plurality of counters based on a predetermined mapping function; and
      in response to determining that the value of the field corresponds to a counter among the plurality of counters, incrementing the corresponding counter;
   upon expiration of a fixed interval, and for each of the plurality of counters, copying a current value of the counter to the user-accessible data structure; and
   resetting the plurality of counters to an initial value.

2. The method according to claim 1, wherein, for each of the plurality of transfer units, said first field is a message type indicator.

3. The method according to claim 1, wherein each of the plurality of transfer units is a message having a message type indicator that specifies a version of the ISO 8583 standard.

4. The method according to claim 1, wherein said user-accessible data structure is implemented in random-access memory.

5. The method according to claim 1, wherein said method comprises, for each of the received first fields, obtaining the field from a database log file.

6. The method according to claim 1, wherein said method comprises, for each of the received first fields, obtaining the field in response to a command to write the corresponding transfer unit to a database.

7. The method according to claim 1, wherein said method comprises:
   receiving, for each of the plurality of transfer units, a second field of the transfer unit; and
   determining, for each of the received second fields, whether a value of the second field corresponds to any counter among a second plurality of counters in the random-access memory based on a second predetermined mapping function.

8. The method according to claim 1, wherein said method comprises, for at least one among the copied values in the user-accessible data structure, comparing the copied value to a corresponding threshold.

9. An apparatus for monitoring a data stream, said apparatus comprising:
   a log reader configured to obtain, for each of a plurality of transfer units from the data stream, a first field of the transfer unit from a log file;
   a random-access memory configured to store a data structure that includes a plurality of counters;
   a mapping module configured to determine, for each of the received first fields, whether a value of the field corresponds to any counter among the plurality of counters based on a predetermined mapping function and, in response to determining the value of the field corresponds to a counter among the plurality of counters, to increment the corresponding counter;
   an interval timer configured to indicate expiration of a fixed interval;
   a user-accessible data structure that is separate from the data structure; and
   a refresh module configured to, upon said expiration indication and for each of the plurality of counters, copy a current value of the counter to the user-accessible data structure and reset the plurality of counters to an initial value.

10. The apparatus according to claim 9, wherein, for each of the plurality of transfer units, said first field is a message type indicator.

11. The apparatus according to claim 9, wherein each of the plurality of transfer units is a message whose value at position one of the first field specifies a version of the ISO 8583 standard.

12. The apparatus according to claim 9, wherein said user-accessible data structure is implemented in the random-access memory.

13. The apparatus according to claim 9, wherein said log reader is configured to obtain, for each of the plurality of transfer units, a second field of the transfer unit, and
   wherein said apparatus includes a second mapping module configured to determine, for each of the received second fields, whether a value of the second field corresponds to any counter among a second plurality of counters based on a second predetermined mapping function.

14. The apparatus according to claim 9, wherein said apparatus comprises a comparator configured to compare at least one among the copied values in the user-accessible data structure to a corresponding threshold.

15. An apparatus for monitoring a data stream, said apparatus comprising:
   an interface configured to obtain, for each of a plurality of transfer units from the data stream and in response to at least one function call by a calling application, a first field of the transfer unit;
   a random-access memory configured to store a data structure that includes a plurality of counters;
   a mapping module configured to determine, for each of the received first fields, whether a value of the field corresponds to any counter among the plurality of counters based on a predetermined mapping function and, in response to determining the value of the field corresponds to a counter among the plurality of counters, to increment the corresponding counter;
   an interval timer configured to indicate expiration of a fixed interval;
   a user-accessible data structure that is separate from the data structure; and
   a refresh module configured to, upon said expiration indication and for each of the plurality of counters, copy a current value of the counter to the user-accessible data structure and reset the plurality of counters to an initial value.

16. The apparatus according to claim 15, wherein, for each of the plurality of transfer units, said first field is a message type indicator, and
   wherein each of the plurality of transfer units is a message whose value at position one of the first field specifies a version of the ISO 8583 standard.

17. The apparatus according to claim 15, wherein said user-accessible data structure is implemented in the random-access memory.

18. The apparatus according to claim 15, wherein said interface is configured, for each of the received first fields, to obtain the field in response to a command to write the corresponding transfer unit to a database.

19. The apparatus according to claim 15, wherein said interface is configured to obtain, for each of the plurality of transfer units, a second field of the transfer unit, and
   wherein said apparatus includes a second mapping module configured to determine, for each of the received second fields, whether a value of the second field corresponds to any counter among a second plurality of counters based on a second predetermined mapping function.

20. The apparatus according to claim 15, wherein said apparatus comprises a comparator configured to compare at least one among the copied values in the user-accessible data structure to a corresponding threshold.

* * * * *